US008795040B2

(12) United States Patent
Burdett et al.

(10) Patent No.: US 8,795,040 B2
(45) Date of Patent: Aug. 5, 2014

(54) AUTONOMOUS VENTILATION SYSTEM

(75) Inventors: Michael P. Burdett, Tucson, AZ (US); Daniel Reich, Tucson, AZ (US)

(73) Assignee: Oy Halton Group Ltd., Helsinki (FI)

( * ) Notice: Subject to any disclaimer, the term of this patent is extended or adjusted under 35 U.S.C. 154(b) by 163 days.

(21) Appl. No.: 13/187,762

(22) Filed: Jul. 21, 2011

(65) Prior Publication Data

US 2011/0275301 A1 Nov. 10, 2011

Related U.S. Application Data

(63) Continuation of application No. 11/947,924, filed on Nov. 30, 2007, now abandoned.

(60) Provisional application No. 60/968,395, filed on Aug. 28, 2007.

(51) Int. Cl.

*B08B 15/02* (2006.01)
*F24C 15/20* (2006.01)
*G01J 5/48* (2006.01)

(52) U.S. Cl.

USPC .................. 454/61; 454/56; 454/58; 454/67; 250/334

(58) Field of Classification Search

USPC .......... 454/61, 56, 58, 67; 250/330, 332, 334, 250/338.1, 342

See application file for complete search history.

(56) References Cited

U.S. PATENT DOCUMENTS

| | | | |
|---|---|---|---|
| 2,743,529 | A | 5/1956 | Hayes |
| 2,833,615 | A | 5/1958 | Kollgaard |
| 2,853,367 | A | 9/1958 | Karol |
| 2,862,095 | A | 11/1958 | Scofield |
| 2,933,080 | A | 4/1960 | Adey |
| 3,045,705 | A | 7/1962 | Hausammann |

(Continued)

FOREIGN PATENT DOCUMENTS

| | | |
|---|---|---|
| AU | 1138776 | 9/1977 |
| AU | 3400697 | 1/1998 |

(Continued)

OTHER PUBLICATIONS

International Search Report and Written Opinion dated Jan. 5, 2007, for International Application No. PCT/US05/26378 filed Jul. 25, 2005.

(Continued)

*Primary Examiner* — Steven B McAllister
*Assistant Examiner* — Frances H Kamps
(74) *Attorney, Agent, or Firm* — Miles & Stockbridge P.C.

(57) ABSTRACT

An autonomous ventilation system includes a variable-speed exhaust fan, a controller, an exhaust hood, and an infrared radiation ("IR") sensor. The exhaust fan removes air contaminants from an area. The controller is coupled to the exhaust fan and adjusts the speed of the exhaust fan. The exhaust hood is coupled to the exhaust fan and directs air contaminants to the exhaust fan. The IR sensor is coupled to the controller, detects changes in IR index in a zone below the exhaust hood, and communicates information relating to detected changes in IR index to the controller. The controller adjusts the speed of the exhaust fan in response to information relating to detected changes in IR index. The autonomous ventilation system also includes an alignment laser to indicate a point at which the IR sensor is aimed and a field-of-view ("FOV") indicator to illuminate the zone in which the IR sensor detects changes in IR index.

10 Claims, 8 Drawing Sheets

(56) References Cited

U.S. PATENT DOCUMENTS

| | | | | |
|---|---|---|---|---|
| 3,323,439 | A | 6/1967 | Waever et al. | |
| 3,332,676 | A | 7/1967 | Namy | |
| 3,381,134 | A | 4/1968 | Wolf | |
| 3,400,649 | A | 9/1968 | Jensen | |
| 3,457,850 | A | 7/1969 | Sweet et al. | |
| 3,513,766 | A | 5/1970 | Alhrich | |
| 3,536,457 | A | 10/1970 | Henderson | |
| 3,612,106 | A | 10/1971 | Camboulives et al. | |
| 3,690,245 | A | 9/1972 | Ferlise et al. | |
| 3,752,056 | A | 8/1973 | Chamberlin et al. | |
| 3,809,480 | A | 5/1974 | Somerville et al. | |
| 3,825,346 | A | 7/1974 | Rizzo | |
| 3,829,285 | A | 8/1974 | Beck | |
| 3,866,055 | A | 2/1975 | Pike | |
| 3,895,569 | A | 7/1975 | Miller | |
| 3,943,836 | A | 3/1976 | Kuechler | |
| 3,952,640 | A | 4/1976 | Kuechler | |
| 3,978,777 | A | 9/1976 | Nett | |
| 4,043,319 | A | 8/1977 | Jensen | |
| 4,047,519 | A | 9/1977 | Nett | |
| 4,050,368 | A | 9/1977 | Eakes | |
| 4,056,877 | A | 11/1977 | Kuechler | |
| 4,085,736 | A | 4/1978 | Kuechler | |
| 4,105,015 | A | 8/1978 | Isom | |
| 4,109,641 | A | 8/1978 | Hunzicker | |
| 4,113,439 | A | 9/1978 | Ookubo | |
| 4,117,833 | A | 10/1978 | Mueller | |
| 4,127,106 | A | 11/1978 | Jensen | |
| 4,134,394 | A | 1/1979 | Otenbaker | |
| 4,138,220 | A | 2/1979 | Davies | |
| 4,146,017 | A | 3/1979 | Overton | |
| 4,147,502 | A | 4/1979 | Milton | |
| 4,153,044 | A | 5/1979 | Nett | |
| 4,155,348 | A | 5/1979 | Ahlrich | |
| 4,160,407 | A | 7/1979 | Duym | |
| 4,211,154 | A | 7/1980 | Eakes | |
| 4,213,947 | A | 7/1980 | Fremont | |
| 4,285,390 | A | 8/1981 | Fortune et al. | |
| 4,286,572 | A | 9/1981 | Searcy | |
| 4,287,405 | A | 9/1981 | Ohmae et al. | |
| 4,346,692 | A | 8/1982 | Mccauley | |
| 4,350,166 | A * | 9/1982 | Mobarry | 600/473 |
| 4,373,507 | A | 2/1983 | Schwartz | |
| 4,398,415 | A | 8/1983 | Jacocks et al. | |
| 4,467,782 | A | 8/1984 | Russel | |
| 4,475,534 | A | 10/1984 | Moriarty | |
| 4,483,316 | A | 11/1984 | Fritz | |
| 4,484,563 | A | 11/1984 | Fritz et al. | |
| 4,497,242 | A * | 2/1985 | Moyer | 454/61 |
| 4,556,046 | A | 12/1985 | Riffel | |
| 4,584,929 | A | 4/1986 | Jarmyr et al. | |
| 4,586,486 | A | 5/1986 | Kaufman | |
| 4,617,909 | A | 10/1986 | Molitor | |
| 4,655,194 | A | 4/1987 | Wooden | |
| 4,706,553 | A | 11/1987 | Sharp et al. | |
| 4,773,311 | A | 9/1988 | Sharp | |
| 4,781,460 | A | 11/1988 | Bott | |
| 4,788,905 | A | 12/1988 | Von Kohorn | |
| 4,793,715 | A * | 12/1988 | Kasner et al. | 374/6 |
| 4,811,724 | A | 3/1989 | Aalto | |
| 4,823,015 | A * | 4/1989 | Galvin et al. | 250/564 |
| 4,831,747 | A * | 5/1989 | Roos et al. | 34/565 |
| 4,856,419 | A | 8/1989 | Imai | |
| 4,872,892 | A | 10/1989 | Vartiainen et al. | |
| 4,903,685 | A | 2/1990 | Melink | |
| 4,903,894 | A | 2/1990 | Pellinen et al. | |
| 4,921,509 | A | 5/1990 | Maclin | |
| 4,934,256 | A | 6/1990 | Moss et al. | |
| 4,944,283 | A | 7/1990 | Tsuchiya | |
| 4,944,285 | A | 7/1990 | Glassman | |
| 5,033,508 | A * | 7/1991 | Laverty, Jr. | 137/624.11 |
| 5,042,453 | A | 8/1991 | Shellenberger | |
| 5,042,456 | A | 8/1991 | Cote | |
| 5,050,581 | A | 9/1991 | Roehl-Hager | |
| 5,063,834 | A | 11/1991 | Aalto | |
| 5,090,303 | A | 2/1992 | Ahmed | |
| 5,092,227 | A | 3/1992 | Ahmed et al. | |
| 5,115,728 | A | 5/1992 | Ahmed et al. | |
| 5,139,009 | A | 8/1992 | Walsh | |
| 5,146,284 | A | 9/1992 | Tabarelli et al. | |
| 5,205,783 | A | 4/1993 | Dieckert et al. | |
| 5,215,075 | A | 6/1993 | Caridis | |
| 5,215,497 | A | 6/1993 | Drees | |
| 5,220,910 | A | 6/1993 | Aalto | |
| 5,240,455 | A | 8/1993 | Sharp | |
| 5,251,608 | A | 10/1993 | Cote | |
| 5,268,739 | A | 12/1993 | Martinelli et al. | |
| 5,311,930 | A | 5/1994 | Bruenn | |
| 5,312,296 | A | 5/1994 | Aalto | |
| 5,312,297 | A | 5/1994 | Dieckert et al. | |
| 5,394,861 | A | 3/1995 | Stegmaier | |
| 5,406,073 | A * | 4/1995 | Sharp et al. | 250/221 |
| 5,414,509 | A | 5/1995 | Veligdan | |
| 5,415,583 | A | 5/1995 | Brandt, Jr. | |
| 5,518,446 | A | 5/1996 | Jacob | |
| 5,522,377 | A | 6/1996 | Fritz | |
| 5,558,821 | A | 9/1996 | Konig | |
| 5,580,535 | A | 12/1996 | Hoke | |
| 5,597,354 | A | 1/1997 | Janu et al. | |
| 5,622,100 | A | 4/1997 | King | |
| 5,657,744 | A | 8/1997 | Vianen | |
| 5,713,346 | A | 2/1998 | Kuechler | |
| 5,716,268 | A | 2/1998 | Strongin | |
| 5,718,219 | A | 2/1998 | Boudreault | |
| 5,720,274 | A | 2/1998 | Brunner et al. | |
| 5,764,579 | A | 6/1998 | McMasters et al. | |
| 5,779,538 | A | 7/1998 | Jardinier | |
| 5,874,292 | A | 2/1999 | McMinn, Jr. | |
| 5,882,254 | A * | 3/1999 | Jacob | 454/61 |
| 5,960,786 | A | 10/1999 | Lambertson | |
| 5,992,152 | A | 11/1999 | Weres et al. | |
| 6,044,838 | A | 4/2000 | Deng | |
| 6,058,929 | A | 5/2000 | Fritz | |
| 6,089,970 | A | 7/2000 | Feustel | |
| 6,154,686 | A * | 11/2000 | Hefferen et al. | 700/276 |
| 6,170,480 | B1 * | 1/2001 | Melink et al. | 126/299 R |
| 6,171,480 | B1 | 1/2001 | Lee et al. | |
| 6,173,710 | B1 | 1/2001 | Gibson et al. | |
| 6,179,763 | B1 | 1/2001 | Phillips, III | |
| 6,252,689 | B1 | 6/2001 | Sharp | |
| 6,336,451 | B1 | 1/2002 | Rohl-Hager et al. | |
| 6,347,626 | B1 | 2/2002 | Yi | |
| 6,351,999 | B1 | 3/2002 | Maul et al. | |
| 6,428,408 | B1 | 8/2002 | Bell et al. | |
| 6,450,879 | B1 | 9/2002 | Suen | |
| 6,515,283 | B1 * | 2/2003 | Castleman et al. | 250/339.15 |
| 6,531,966 | B2 * | 3/2003 | Krieger | 340/932.2 |
| 6,549,554 | B2 | 4/2003 | Shiojima et al. | |
| 6,645,066 | B2 | 11/2003 | Gutta et al. | |
| 6,669,547 | B2 | 12/2003 | Liu | |
| 6,752,144 | B1 | 6/2004 | Lee | |
| 6,782,294 | B2 | 8/2004 | Reich et al. | |
| 6,846,236 | B2 | 1/2005 | Gregoricka | |
| 6,851,421 | B2 | 2/2005 | Livchak et al. | |
| 6,869,468 | B2 | 3/2005 | Gibson | |
| 6,878,195 | B2 | 4/2005 | Gibson | |
| 6,890,252 | B2 | 5/2005 | Liu | |
| 6,899,095 | B2 | 5/2005 | Livchak | |
| 6,916,239 | B2 | 7/2005 | Siddaramanna et al. | |
| 6,920,874 | B1 | 7/2005 | Siegel | |
| 6,974,380 | B2 | 12/2005 | Cui et al. | |
| 7,048,199 | B2 | 5/2006 | Melink | |
| 7,147,168 | B1 | 12/2006 | Bagwell et al. | |
| 7,258,280 | B2 | 8/2007 | Wolfson | |
| 7,318,771 | B2 | 1/2008 | Huang | |
| 7,364,094 | B2 | 4/2008 | Bagwell et al. | |
| 7,442,119 | B2 | 10/2008 | Fluhrer | |
| 7,699,051 | B2 * | 4/2010 | Gagas et al. | 126/299 D |
| 7,866,312 | B2 * | 1/2011 | Erdmann | 126/299 D |
| 2003/0104778 | A1 | 6/2003 | Liu | |
| 2003/0146082 | A1 | 8/2003 | Gibson et al. | |
| 2003/0207662 | A1 | 11/2003 | Liu | |
| 2003/0210340 | A1 * | 11/2003 | Romanowich | 348/272 |
| 2004/0011349 | A1 | 1/2004 | Livchak et al. | |

(56) References Cited

U.S. PATENT DOCUMENTS

| | | | | |
|---|---|---|---|---|
| 2005/0007578 | A1 * | 1/2005 | Ziemins et al. | 356/153 |
| 2005/0098640 | A1 * | 5/2005 | Ichishi et al. | 236/49.3 |
| 2005/0115557 | A1 | 6/2005 | Meredith | |
| 2005/0229922 | A1 | 10/2005 | Magner et al. | |
| 2005/0279845 | A1 | 12/2005 | Bagwell et al. | |
| 2006/0009147 | A1 | 1/2006 | Huang et al. | |
| 2006/0032492 | A1 | 2/2006 | Bagwell et al. | |
| 2006/0060187 | A1 | 3/2006 | Luddy et al. | |
| 2006/0219235 | A1 | 10/2006 | Bagwell et al. | |
| 2006/0278216 | A1 * | 12/2006 | Gagas et al. | 126/299 D |
| 2007/0001111 | A1 * | 1/2007 | Rueb et al. | 250/236 |
| 2007/0015449 | A1 | 1/2007 | Livchak et al. | |
| 2007/0023349 | A1 | 2/2007 | Kyllonen et al. | |
| 2007/0068509 | A1 | 3/2007 | Bagwell et al. | |
| 2007/0165353 | A1 | 7/2007 | Fleischer | |
| 2007/0183154 | A1 | 8/2007 | Robson | |
| 2007/0184771 | A1 | 8/2007 | Fluhrer | |
| 2007/0202791 | A1 | 8/2007 | Lee | |
| 2007/0229293 | A1 * | 10/2007 | Martino | 340/630 |
| 2007/0272230 | A9 | 11/2007 | Meredith et al. | |
| 2008/0045132 | A1 | 2/2008 | Livchak et al. | |
| 2008/0138750 | A1 * | 6/2008 | Kim | 431/12 |
| 2008/0141996 | A1 | 6/2008 | Erdmann | |
| 2008/0207109 | A1 | 8/2008 | Bagwell | |
| 2008/0258063 | A1 * | 10/2008 | Rapanotti | 250/334 |
| 2008/0297808 | A1 * | 12/2008 | Riza et al. | 356/503 |
| 2008/0302247 | A1 | 12/2008 | Magner | |
| 2008/0308088 | A1 | 12/2008 | Livchak | |
| 2009/0032011 | A1 * | 2/2009 | Livchak et al. | 126/299 D |
| 2009/0093210 | A1 | 4/2009 | Livchak | |
| 2009/0199844 | A1 | 8/2009 | Meredith | |
| 2011/0269386 | A1 | 11/2011 | Burdett et al. | |

FOREIGN PATENT DOCUMENTS

| | | |
|---|---|---|
| AU | 2933601 | 7/2001 |
| BE | 838829 | 6/1976 |
| CA | 1054430 | 5/1979 |
| CA | 1069749 | 1/1980 |
| CA | 1081030 | 7/1980 |
| CA | 2536332 | 3/2005 |
| CH | 682512 | 9/1993 |
| DE | 314477 | 9/1919 |
| DE | 2607301 | 9/1976 |
| DE | 2659736 | 7/1977 |
| DE | 3519189 | 12/1986 |
| DE | 4120175 | 2/1992 |
| DE | 4114329 | 11/1992 |
| DE | 4203916 | 4/1993 |
| DE | 19613513 | 10/1997 |
| EP | 0314085 | 5/1989 |
| EP | 0401583 | 12/1990 |
| EP | 0541862 | 5/1993 |
| EP | 0541863 | 5/1993 |
| EP | 0623398 | 11/1994 |
| EP | 0753706 | 1/1997 |
| EP | 0881935 | 12/1998 |
| EP | 1250556 | 10/2002 |
| EP | 1637810 | 3/2006 |
| EP | 1778418 | 2/2007 |
| FI | 58971 | 1/1981 |
| FR | 2008451 | 1/1970 |
| FR | 2301778 | 9/1976 |
| FR | 2705766 | 2/1994 |
| GB | 1544445 | 4/1979 |
| GB | 2054143 | 2/1981 |
| GB | 2132335 | 7/1984 |
| GB | 2266340 | 10/1993 |
| HK | 1019417 | 2/2000 |
| JP | 51-132645 | 11/1976 |
| JP | 60-213753 | 10/1985 |
| JP | 63-091442 | 4/1988 |
| JP | 63-251741 | 10/1988 |
| JP | 10-084039 | 3/1989 |
| JP | 02-033552 | 2/1990 |
| JP | 32-047937 | 11/1991 |
| JP | 40-000140 | 1/1992 |
| JP | 40-062347 | 2/1992 |
| JP | 40-068242 | 3/1992 |
| JP | 41-013143 | 4/1992 |
| JP | 52-048645 | 9/1993 |
| JP | 10-288371 | 10/1998 |
| JP | H11-514734 | 12/1999 |
| JP | 2000-081216 | 3/2000 |
| JP | 2002-089859 | 3/2002 |
| JP | 2003-519771 | 6/2003 |
| JP | 2003-269770 | 9/2003 |
| NL | 7601862 | 2/1976 |
| SE | 7602168 | 8/1976 |
| SE | 7904443 | 11/1980 |
| WO | 86/06154 | 10/1986 |
| WO | 91/17803 | 11/1991 |
| WO | 92/08082 | 5/1992 |
| WO | 97/48479 | 12/1997 |
| WO | 01/51857 | 7/2001 |
| WO | 01/83125 | 11/2001 |
| WO | 01/84054 | 11/2001 |
| WO | 02/14728 | 2/2002 |
| WO | 02/14746 | 2/2002 |
| WO | 03/056252 | 7/2003 |
| WO | 2005/019736 | 3/2005 |
| WO | 2005/114059 | 12/2005 |
| WO | 2006/002190 | 1/2006 |
| WO | 2006/012628 | 2/2006 |
| WO | 2006/074420 | 7/2006 |
| WO | 2006/074425 | 7/2006 |
| WO | 2007/121461 | 10/2007 |
| WO | 2008/157418 | 12/2008 |
| WO | 2009/092077 | 7/2009 |
| WO | 2009/129539 | 10/2009 |

OTHER PUBLICATIONS

Abstract for Gidaspow, D. "Multiphase Flow and Fluidization-Continuum and Kinetic Theory Descriptions", Academic Press 1994.

Saravelou et al., "Detailed Modeling of a Swirling Coal Flame", *Combustion Science and Technology*, 1997, 123: pp. 1-22.

Morsi et al., "An Investigation of Particle Trajectories in Two-Phase Flow Systems", *Journal of Fluid Mechanics*, 1972, 55: pp. 193-208.

Abstract for Tennekes et al., "A First Course of Turbulence", Mass. Inst. Tech., 1972.

Prosecution history of U.S. Appl. No. 07/010,277, now U.S. Patent No. 4,811,724.

Non-Final Office Action, dated May 28, 2010, in U.S. Appl. No. 12/407,686.

Translation of foreign patent document DE 4203916.

Skimm, G.K., *Technician's Guide to HVAC*, 1995, McGraw-Hill, pp. 322-330.

* cited by examiner

AUTONOMOUS VENTILATION SYSTEM

CROSS-REFERENCE TO RELATED APPLICATIONS

This application is a continuation of Application No. 11/947,924 filed Nov. 30, 2007. This application also claims the benefit under 35 U.S.C. §119(e) of U.S. Provisional Application No. 60/968,395 filed Aug. 28, 2007, entitled "Smart Kitchen Ventilation Hood with Thermopile Sensor." The entire content of each of the foregoing applications is hereby incorporated by reference into the present application.

TECHNICAL FIELD

This disclosure relates in general to control systems and more particularly to an autonomous ventilation system.

BACKGROUND

Ventilation systems are commonly found in modern residential, restaurant, and commercial kitchens. Heat, smoke, and fumes are an ordinary byproduct of cooking many foods and must be removed in order to protect the health and comfort of those present in the kitchen and adjacent areas. Ventilation systems provide an effective way to capture excessive heat, smoke, and fumes generated in kitchens and ventilate them to the atmosphere where they pose no threat to health or safety.

A typical ventilation system consists of an exhaust hood positioned over pieces of cooking equipment that are known to produce heat, smoke, or fumes. This exhaust hood is usually connected via ducts to an exhaust fan and in turn to a vent located on the outside of the building housing the kitchen. The exhaust fan is operated in a way to create a flow of air from the exhaust hood to the outside vent. This creates a suction effect at the exhaust hood that captures the air and any airborne contaminants around the hood. Consequently, any heat, smoke, or fumes generated by the cooking equipment will rise up to the overhead exhaust hood where it will be captured by the suction and transported out of the kitchen to the outside vent. There, it will dissipate harmlessly into the atmosphere.

Most ventilation systems must be manually activated and deactivated by the user. In a typical fast-food restaurant, for example, an employee must manually activate the kitchen ventilation system early in the day or before any cooking occurs. The system will then remain active in order to capture any smoke or fumes that may result from cooking. The system must then be manually deactivated periodically, at the end of the day, or after all cooking has ceased. This manual operation of the ventilation system typically results in the system being active at times when ventilation is not actually required. This needlessly wastes energy not only associated with the operation of the ventilation system, but also due to the ventilation of uncontaminated air supplied to the kitchen by a heating and cooling system. By operating when no smoke or fumes are present, the ventilation system will remove other valuable air that was supplied to heat or cool the kitchen and thus cause the heating and cooling system to operate longer than it would have otherwise.

SUMMARY OF THE DISCLOSURE

The present disclosure provides an autonomous ventilation system that substantially eliminates or reduces at least some of the disadvantages and problems associated with previous methods and systems.

According to one embodiment, an autonomous ventilation system includes a variable-speed exhaust fan, a controller, an exhaust hood, and an infrared radiation ("IR") sensor. The exhaust fan removes air contaminants from an area. The controller is coupled to the exhaust fan and adjusts the speed of the exhaust fan. The exhaust hood is coupled to the exhaust fan and directs air contaminants to the exhaust fan. The IR sensor is coupled to the controller, detects changes in IR index in a zone below the exhaust hood, and communicates information relating to detected changes in IR index to the controller. The controller adjusts the speed of the exhaust fan in response to information relating to changes in IR index detected by the IR sensor. Other embodiments also include an alignment laser to visibly indicate a point at which the IR sensor is aimed and a field-of-view ("FOV") indicator to illuminate the zone below the exhaust hood in which the IR sensor detects changes in IR index.

Technical advantages of certain embodiments may include a reduction in energy consumption, an increase in the comfort of the ventilated area, and a decrease in noise. Embodiments may eliminate certain inefficiencies such as needlessly ventilating valuable air from an area that was supplied by a heating, ventilation, and air conditioning ("HVAC") system.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Figure 1:
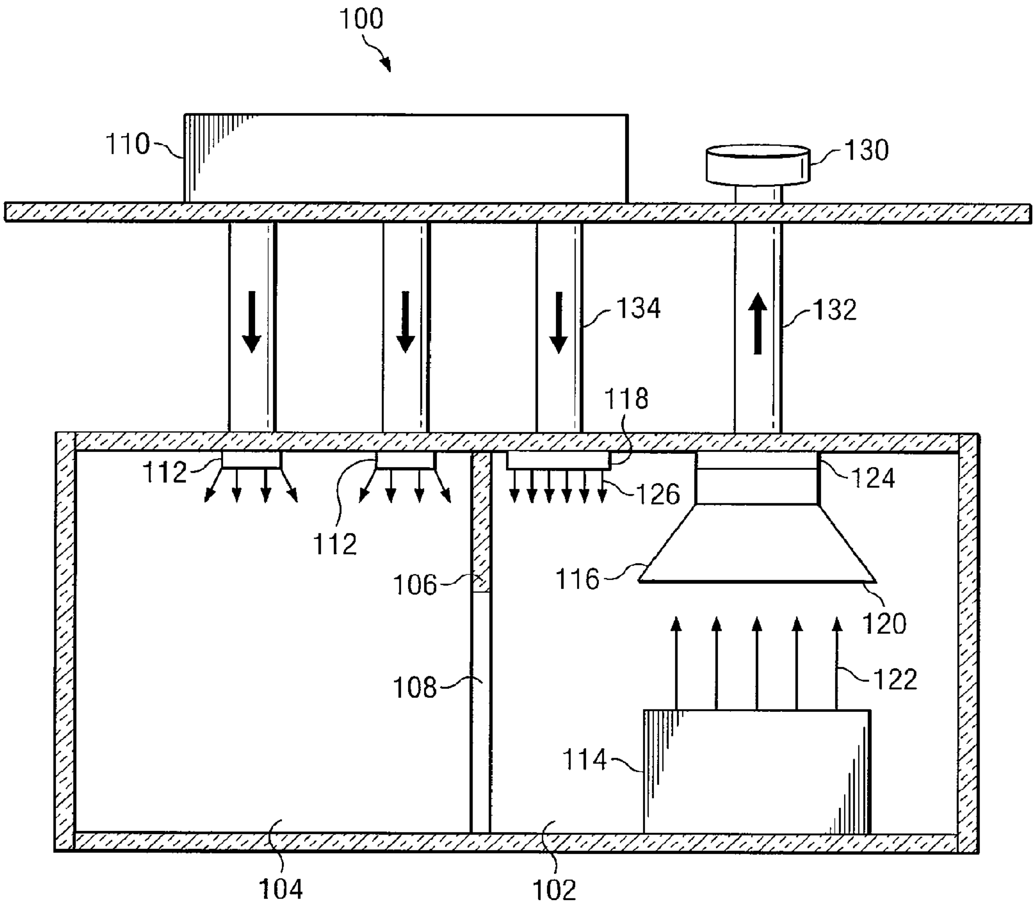
FIG. 1 is a simplified block diagram illustrating a facility requiring ventilation in accordance with a particular embodiment.

FIG. 1 depicts a facility 100 where a particular embodiment may be utilized. Facility 100 may be a restaurant, for example, that includes a kitchen 102 and at least one adjacent room 104 separated by a wall 106. Wall 106 contains a doorway 108 that allows access between kitchen 102 and adjacent room 104. Facility 100 also includes an HVAC system 110 that provides conditioned air to the interior of facility 100 via interior vents 112. Kitchen 102 includes one or more pieces of cooking equipment 114, an exhaust hood 116, a ceiling supply air vent 118, and a ceiling exhaust vent 124. Examples of cooking equipment 114 include, but are not limited to, stoves, cooktops, ovens, fryers, and broilers. Exhaust hood 116 is oriented such that a downward-facing opening 120 is operable to direct an air contaminant 122 associated with the operation of cooking equipment 114 through ceiling exhaust vent 124 and ultimately out an exterior exhaust vent 130 via an exhaust duct 132. Air contaminant 122 includes, but is not limited to, smoke, steam, fumes, and/or heat. Ceiling supply air vent 118 is connected to a supply air duct 134 and is operable to provide supply air 126. Supply air 126 may be supplied from HVAC system 110 and may include conditioned air (i.e., heated or cooled air) or unconditioned air. Supply air 126 may be supplied in an amount corresponding to the amount of air removed from kitchen 102 via exhaust hood 116 such that the air pressure inside kitchen 102 remains relatively constant.

Removing air contaminant 122 from kitchen 102 helps ensure that kitchen 102, as well as adjacent room 104, remains safe, sufficiently free of air contaminant 122, and at a comfortable temperature for anyone inside. The volume of air exhausted via exhaust hood 116 should be carefully regulated to minimize the quantity of conditioned air (air entering facility 100 through HVAC system 110) that is vacated from kitchen 102 and facility 100 while ensuring that enough air is ventilated to prevent buildup of air contaminant 122. Because a particular piece of cooking equipment 114 may not be in use at all times and thus will not continuously generate air contaminant 122, it becomes beneficial to vary the rate at which exhaust hood 116 ventilates air contaminant 122 from kitchen 102 as well as the rate at which ceiling supply air vent 118 supplies air to kitchen 102 as a means to conserve energy and increase occupant safety and comfort. The embodiments discussed below provide a convenient alternative to manually activating a ventilation system as the level of air contaminants fluctuates.

While facility 100 has been described in reference to a restaurant, it should be noted that there are many facilities in need of such ventilation systems. Such facilities include manufacturing facilities, industrial facilities, residential kitchens, and the like. Likewise, embodiments in this disclosure are described in reference to kitchen 102, but could be utilized in any facility requiring ventilation.

Figure 2:
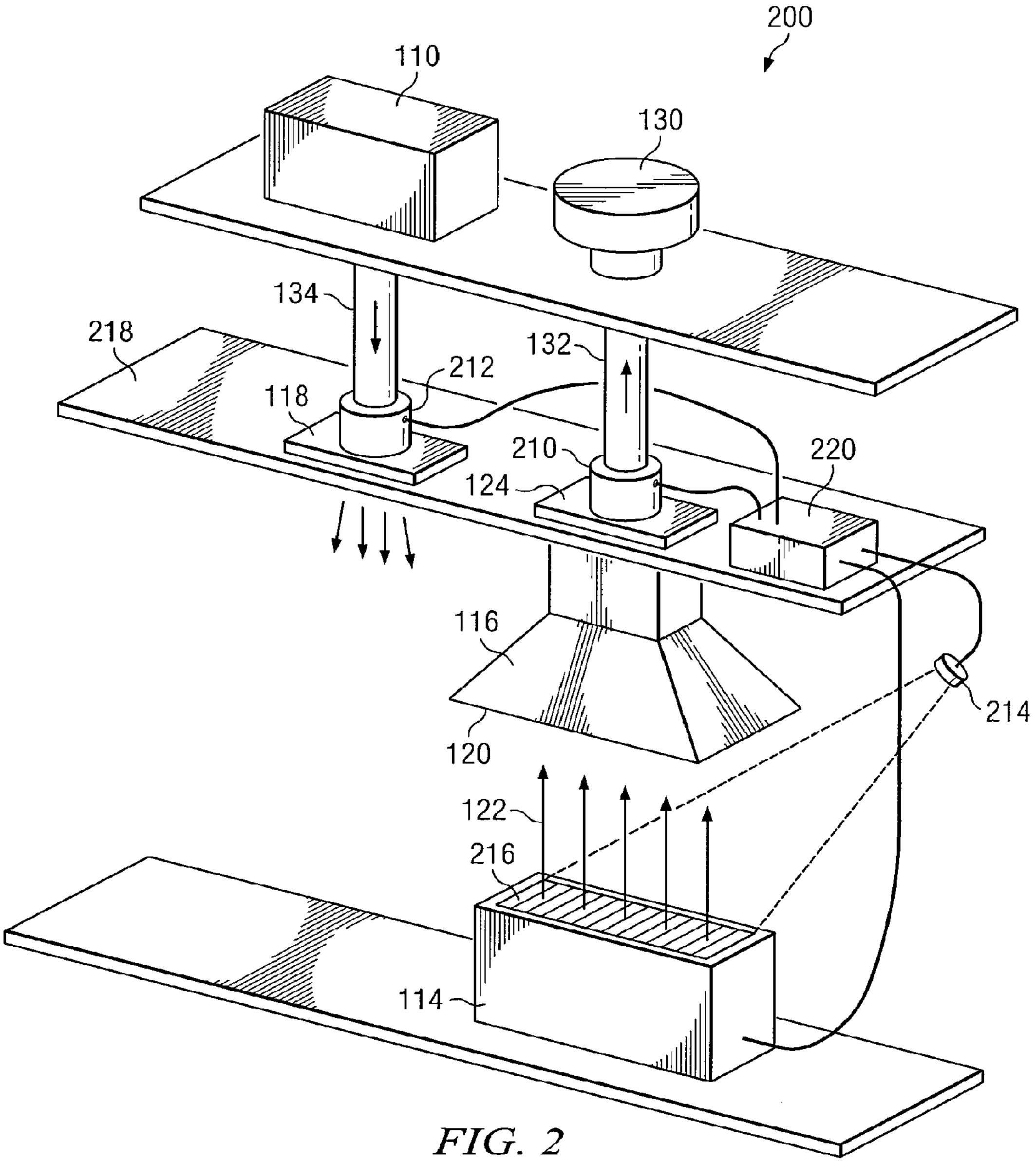
FIG. 2 is a simplified block diagram illustrating a ventilation system in accordance with a particular embodiment.

FIG. 2 depicts an autonomous ventilation system 200 as would be located inside kitchen 102 in accordance with a particular embodiment. Autonomous ventilation system 200 includes exhaust hood 116 with downward-facing opening 120. Exhaust hood 116 is coupled to ceiling exhaust vent 124 and is positioned above one or more pieces of cooking equipment 114. Air is drawn up through exhaust hood 116 via downward-facing opening 120 by an exhaust fan 210. Exhaust fan 210 may be positioned anywhere that allows it to draw air up through exhaust hood 116 including, but not limited to, inside exhaust hood 116 and exhaust duct 132. Autonomous ventilation system 200 also includes ceiling supply air vent 118 that can supply conditioned or unconditioned air to kitchen 102 from HVAC system 110. Air is supplied to kitchen 102 by a supply air fan 212 that is located in a position so as to create a flow of air through supply air duct 134 and ultimately out ceiling supply air vent 118. Autonomous ventilation system 200 also includes an IR sensor 214 that can detect IR index (the heat signature given off by an object) fluctuations in or about a cooking zone 216 associated with cooking equipment 114 beneath exhaust hood 116. According to a particular embodiment, IR sensor 214 is a thermopile sensor for remotely sensing infrared radiation changes in cooking zone 216. IR sensor 214, however, may be any type of IR sensor and is not limited in scope to a thermopile sensor. IR sensor 214 may be mounted inside exhaust hood 116, on top of exhaust hood 116, on a ceiling 218, or in any other position that allows it to detect IR index fluctuations in cooking zone 216 beneath exhaust hood 116. Cooking zone 116 may envelop an area adjacent to cooking equipment 114 or any portion of cooking equipment 114.

Autonomous ventilation system 200 is controlled by a controller 220. Controller 220 is coupled to IR sensor 214, exhaust fan 210, supply air fan 212, and/or cooking equipment 114. Controller 220 has auto-calibration and control logic that may be heuristically adjusted from observation of the environment, as discussed below. Controller 220 communicates with IR sensor 214 to observe the environment and determine IR index fluctuations in or about cooking zone 216. Controller 220 also communicates with exhaust fan 210 to control its speed and consequently the rate of ventilation of autonomous ventilation system 200. In some embodiments, controller 220 additionally communicates with supply air fan 212 to control its speed and thus the amount of air that is re-supplied to kitchen 102. Controller 220 may also be coupled to cooking equipment 114 in order to determine when it has been turned on and off.

In operation, controller 220 automatically adjusts the speed of exhaust fan 210 and thus the ventilation rate of autonomous ventilation system 200 based on a schedule and/or certain conditions sensed by IR sensor 214. These conditions may include the energy level of cooking equipment 114, the state of IR sensor 214, the introduction of uncooked food into cooking zone 216, and/or the presence of excessive amounts of air contaminant 122.

First, controller 220 may turn exhaust fan 210 on and off and/or adjust its speed based on the energy level of cooking equipment 114. Controller 220 may observe cooking equipment 114 with IR sensor 214 and determine an average IR index for the cooking surface or cooking medium when it is not in use. When a user then activates cooking equipment 114, controller 220 may detect via IR sensor 214 the increase in the IR index of the cooking surface or the cooking medium and set the rate of exhaust fan 210 to an idle rate. This idle rate may be a fixed predetermined speed or it may be a speed based on the IR index as measured by IR sensor 214. Conversely, controller 220 may decrease the speed or completely turn off exhaust fan 210 when it is determined via IR sensor 214 that cooking equipment 114 has been turned off. To determine if cooking equipment 114 has been turned off, controller 220 may determine that the IR index of the cooking surface or cooking medium of cooking equipment 114 has decreased to or towards the typical IR index when not in use. In some embodiments, controller 220 may be additionally or alternatively coupled to cooking equipment 114 to detect when it has been activated and deactivated. By automatically controlling the ventilation rate based on the energy level of cooking equipment 114, autonomous ventilation system 200 alleviates disadvantages of other ventilation systems such as wasted energy and unnecessary noise.

In some embodiments, controller 220 may additionally or alternatively adjust the speed of exhaust fan 210 based on the state of IR sensor 214. In this configuration, controller 220 monitors whether sensor 214 has been activated by a user. When a user activates IR sensor 214, controller 220 will set the speed of exhaust fan 210 to a predetermined idle rate or a rate based on the IR index measured by IR sensor 214. In addition, a user may choose to override IR sensor 214 altogether. By pushing the appropriate override button, a user may choose to override IR sensor 214 and manually force controller 220 to increase the speed of exhaust fan 210. This allows the user manual control of autonomous ventilation system 200 when desired.

In addition or alternatively, controller 220 of autonomous ventilation system 200 may set the speed of exhaust fan 210 to a predetermined normal cooking rate when IR sensor 214 detects a drop in IR index in all or part of cooking zone 216 due to the introduction of uncooked or cold food. As examples only, IR sensor 214 may detect a drop in IR index in all or part of cooking zone 216 due to cold and/or uncooked food being placed over an active burner, cold and/or uncooked food (such as frozen hamburger patties) being placed at the input to a broiler, or uncooked french fries being placed into a fryer. As a result of detecting such an event and setting the speed of exhaust fan 210 to a predetermined normal cooking rate, autonomous ventilation system 200 will be operational and will ventilate any airborne contaminant 122 that may result in the ensuing cooking session.

Controller 220 may additionally or alternatively set the speed of exhaust fan 210 to a predetermined flare-up rate when IR sensor 214 detects a change in IR index in cooking zone 216 due to a flare-up in cooking. Such changes in IR index may include a decrease due to the presence of excessive amounts of air contaminant 122 such as smoke or vapor or it may be an increase due to the presence of excessive heat and/or flames. Conversely, controller 220 may decrease the speed or completely turn off exhaust fan 210 after a predetermined amount of cooking time or when IR sensor 214 detects an IR index corresponding to a low, non-cooking, or non flare-up condition. This will additionally increase the energy efficiency and comfort level of the kitchen while minimizing unneeded noise.

The idle, cooking, and flare-up rates of exhaust fan 210 may be determined in a variety of ways. For example, these rates may be preset and/or preprogrammed into controller 220 based on the type of cooking equipment and/or the type of food being cooked under exhaust hood 116. A user may also determine and/or adjust these rates heuristically by observing the operation of autonomous ventilation system 200 in the environment in which it is installed. Pre-determined times for particular cooking equipment could also be provided from a manufacturer or standards body. It should also be noted that even though three distinct rates have been identified, it is intended that the present disclosure encompass other rates as well. For example, controller 220 may gradually increase the rate of exhaust fan 210 over time from a lower rate such as the idle rate to a higher rate such as the cooking rate. Likewise, it may gradually decrease the rate of exhaust fan 210 over time from a higher rate such as the flare-up rate to a lower rate such as the cooking rate.

In some embodiments, controller 220 may also automatically control the speed of supply air fan 212 to provide a desired pressurization of kitchen 102. For example, it may set the speed of supply air fan 212 to match the speed of exhaust fan 210. As a result, the rate at which air is removed and supplied to kitchen 102 is approximately equal and thus the temperature and air pressure remains relatively constant. Controller 220 may also set the speed of supply air fan 212 to a speed that is greater than the speed of exhaust fan 210 to create positive pressure in kitchen 102. This ensures that the environment in kitchen 102 remains safe and comfortable regardless of how much air is being ventilated through exhaust hood 116.

Exhaust fan 210 and supply air fan 212 may be powered by various types of motors including, but not limited to, AC single-phase electrical motors, AC three-phase electrical motors, and DC electrical motors. The speeds of exhaust fan 210 and supply air fan 212 may be adjusted by controller 220 by modulating the frequency of the output of a variable frequency drive in the case of AC single-phase or three-phase electrical motors, by a phase cut modulation technique in the case of a single-phase motor, or by changing voltage in case of a DC electrical motor.

Figure 3:
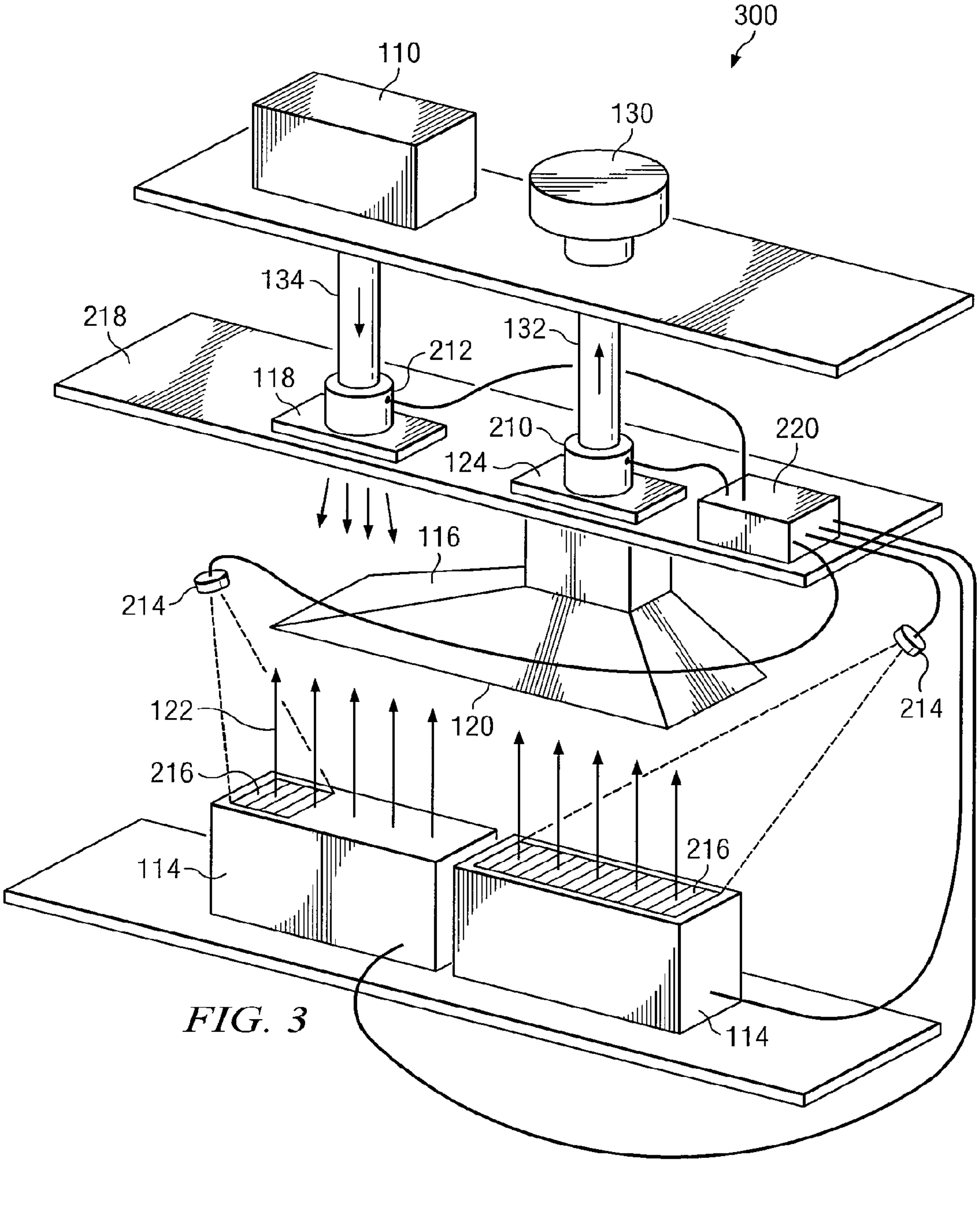
FIG. 3 is a simplified block diagram illustrating a ventilation system in accordance with another particular embodiment.

With reference now to FIG. 3, an additional embodiment of an autonomous ventilation system is provided. In this embodiment, an autonomous ventilation system 300 is operable to ventilate air contaminant 122 produced from more than one piece of cooking equipment 114. Autonomous ventilation system 300 comprises the same components described above in reference to autonomous ventilation system 200, but with minor modifications. In this embodiment, more than one IR sensor 214 and more than one piece of cooking equipment 114 are coupled to controller 220. Each IR sensor 214 can detect IR index fluctuations in or about a corresponding cooking zone 216 beneath exhaust hood 116. Exhaust hood 116 is positioned above the more than one piece of cooking equipment 114 and directs air contaminants 122 to ceiling exhaust vent 124.

In operation, controller 220 of autonomous ventilation system 300 adjusts the speed of exhaust fan 210 based on a schedule or certain conditions sensed by IR sensors 214 in a similar manner as described above in reference to autonomous ventilation system 200. For example, controller 220 may set the rate of exhaust fan 210 to an appropriate rate when any IR sensor 214 detects a change in the level of energy of any piece of cooking equipment 114 under exhaust hood 116. Controller 220 may set the speed of exhaust fan 210 to the default idle rate when it is determined via IR sensors 214 that any piece of cooking equipment 114 under exhaust hood 116 has been activated. Conversely, controller 220 may decrease the speed or completely turn off exhaust fan 210 when it is determined via IR sensors 214 that some or all of cooking equipment 114 has been turned off. In addition, controller 220 of autonomous ventilation system 300 may set the speed of exhaust fan 210 to a predetermined cooking rate based on the IR index in all or part of cooking zones 216 as determined by IR sensors 214. In this situation, controller 220 first determines the appropriate rate for each individual piece of cooking equipment 114. Such rates include, for example, the normal cooking rate and the flare-up rate as described above in reference to autonomous ventilation system 200. Controller 220 then sets the speed of exhaust fan 210 to the sum of the required rates of each of the pieces of cooking equipment 114 under exhaust hood 116 (or any other suitable speed including one based on the size and shape of exhaust hood 116 or the type of cooking equipment 114.) Controller 220 may conversely decrease the speed or completely turn off exhaust fan 210 after a predetermined amount of cooking time or when IR sensors 214 detect an IR index corresponding to a low, non-cooking, or non flare-up condition under exhaust hood 116.

Modifications, additions, or omissions may be made to autonomous ventilation system 300 and the described components. As an example, while FIG. 3 depicts two pieces of cooking equipment 114, two IR sensors 214, and two cooking zones 216, autonomous ventilation system 300 may be modified to include any number and combination of these items. Additionally, while certain embodiments have been described in detail, numerous changes, substitutions, variations, alterations and modifications may be ascertained by those skilled in the art. For example, while autonomous ventilation systems 200 and 300 have been described in reference to kitchen 102 and cooking equipment 114, certain embodiments may be utilized in other facilities where ventilation is needed. Such facilities include manufacturing facilities, industrial facilities, residential kitchens, and the like. It is intended that the present disclosure encompass all such changes, substitutions, variations, alterations and modifications as falling within the spirit and scope of the appended claims.

Figure 4A:
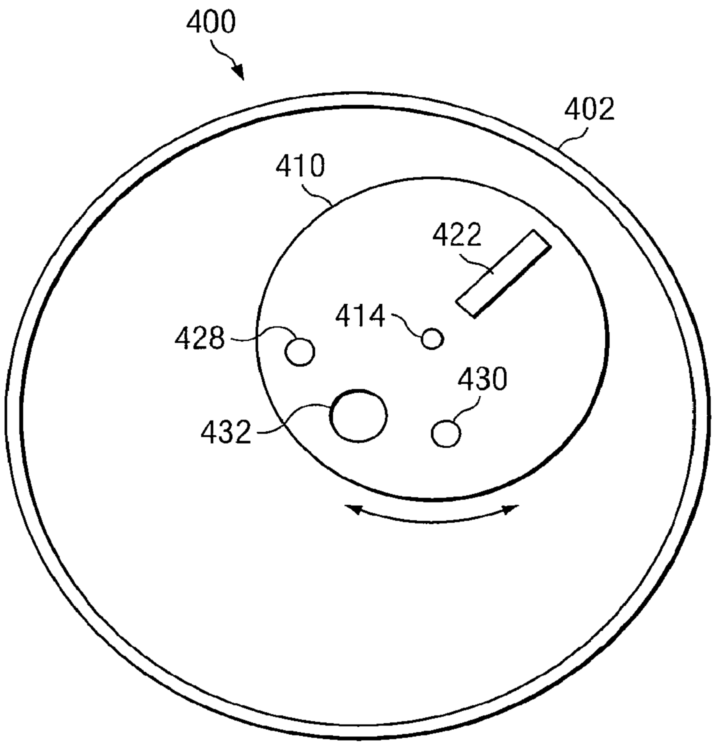
FIG. 4A-4C is an exploded view of an IR sensor assembly in accordance with a particular embodiment.
Figure 4B:
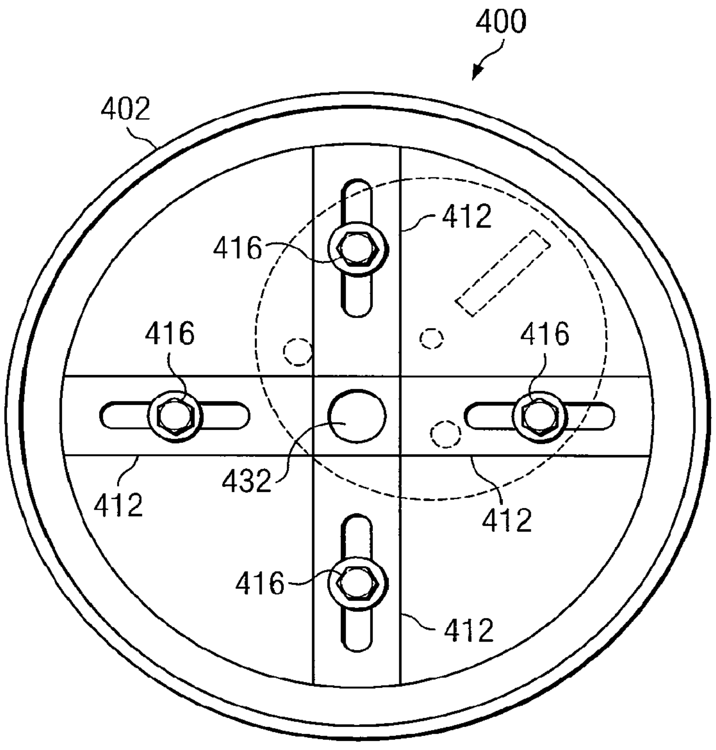
Figure 4C:
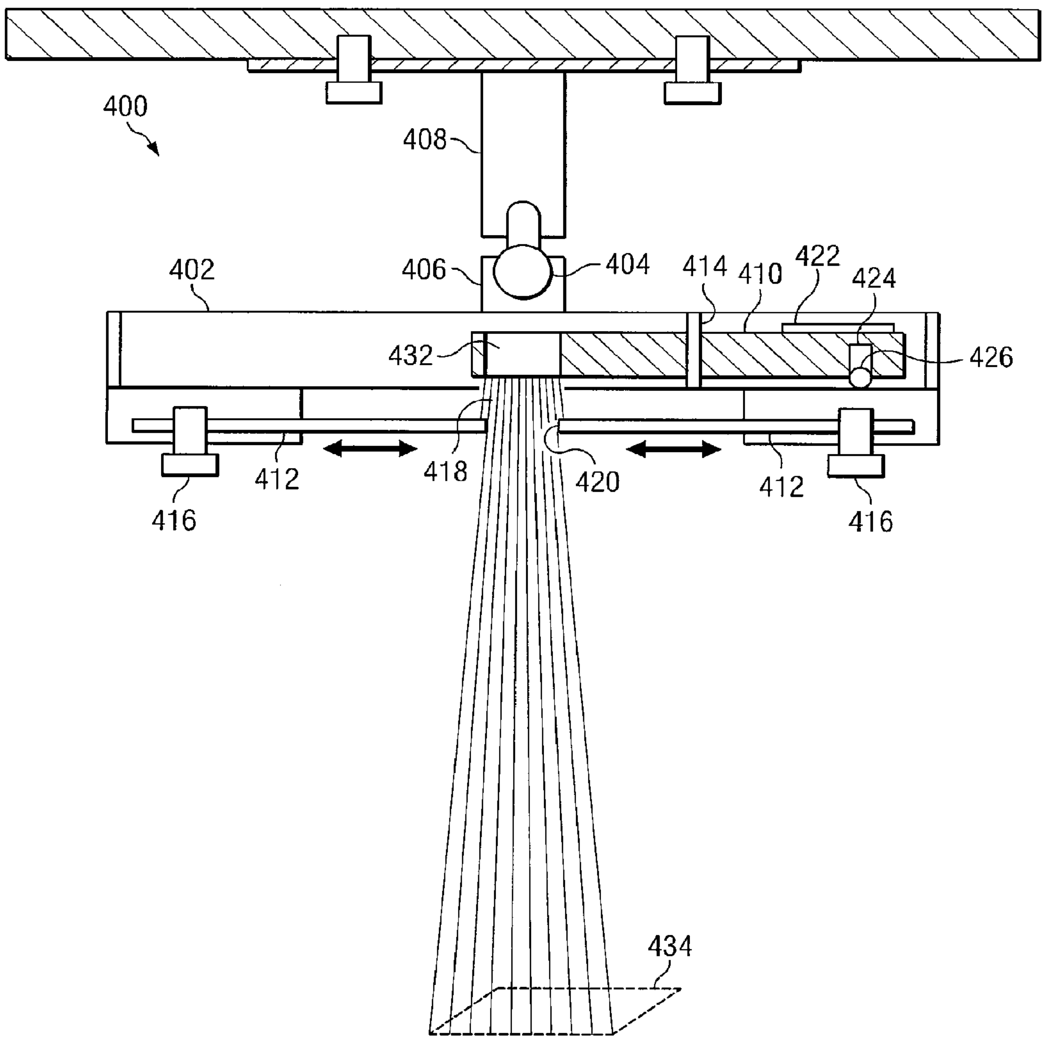

FIGS. 4A through 4C depict an IR sensor assembly 400, which could be utilized as IR sensor 214, discussed above in connection with FIGS. 2 and 3. FIG. 4A provides a top view of IR sensor assembly 400, FIG. 4B provides a bottom view of IR sensor assembly 400, and FIG. 4C provides a side view of IR sensor assembly 400.

IR sensor assembly 400 includes a housing 402, a ball joint 404, a ball joint bracket 406, and a mounting bracket 408. Ball joint 404 is coupled to mounting bracket 408 and housing 402 is coupled to ball joint bracket 406. Ball joint 404 fits inside ball joint bracket 406 and allows coupled housing 402 to rotate freely about ball joint 404.

Housing 402 includes a rotating turret 410, aperture shunts 412, an axle pin 414, aperture set screws 416, a fixed aperture 418, and an adjustable aperture 420. Fixed aperture 418 is located on one side of housing 402 and allows light and infrared radiation to pass in and out of housing 402. Aperture shunts 412 are affixed adjacent to fixed aperture 418 with aperture set screws 416. Aperture set screws 416 may be manually adjusted in a way that allows aperture shunts 412 to slide and block a portion, none, or all of the light that exits housing 402 via fixed aperture 418. The ends of aperture shunts 412 form adjustable aperture 420 whose shape may be manipulated by adjusting the position of one or more aperture shunts 412. Aperture shunts 412 may be black or otherwise dark in color to reduce disturbances in the light emitted from adjustable aperture 420.

Rotating turret 410 includes a rotation handle 422, a retention spring 424, a retention bearing 426, an alignment laser 428, a field-of-view ("FOV") indicator 430, and a thermopile sensor 432. Rotation handle 422 is affixed to rotating turret 410 and rotating turret 410 is affixed to housing 402 via axle pin 414. Rotating turret 410 is operable to rotate about axle pin 414 by grasping and applying force to rotation handle 422. Retention spring 424 is affixed to rotating turret 410 and is subsequently coupled to retention bearing 426. Retention spring 424 applies pressure to retention bearing 426 that is in contact with housing 402. This pressure creates resistance to the movement of rotating turret 410 and thus ensures rotating turret 410 does not rotate without sufficient force by the user. Alignment laser 428, FOV indicator 430, and thermopile sensor 432 are affixed to rotating turret 410 in such a way that each may be aligned with fixed aperture 418. When rotating turret 410 is rotated into the appropriate position, alignment laser 428, FOV indicator 430, and thermopile sensor 432 may each have a clear line-of-sight out of housing 402 via fixed aperture 418.

In operation, IR sensor assembly 400 is mounted with mounting bracket 408 in a location where it has a clear line-of-sight to an area to be monitored for IR index fluctuations. Once mounted in a desired location, housing 402 may be adjusted by pivoting housing 402 about ball joint 404. This allows three dimensional adjustments to aim IR sensor assembly 400 at the desired location. To select one of the attached instruments including alignment laser 428, FOV indicator 430, and thermopile sensor 432, the user grasps rotation handle 422 and rotates rotating turret 410 about axle pin 414 until the desired instrument is aligned with fixed aperture 418. This allows the selected instrument to have a clear line-of-sight out of housing 402.

To ensure IR sensor assembly 400 is aimed at the correct location to be monitored for IR index fluctuations, the user would first rotate rotating turret 410 to select FOV indicator 430. FOV indicator 430 may be any visible light emitting device including, but not limited to, a bright light LED. Once FOV indicator 430 is selected and activated, it will shine light out of housing 402 via fixed aperture 418. The result will be a field of view 434 which is a pattern of light on an object in the line-of-sight of FOV indicator 430 in the shape of fixed aperture 418. This corresponds with the field of view of thermopile sensor 432 when such sensor is rotated into position in line with aperture 418/420.

Initially, adjustable aperture 420 is larger in size than fixed aperture 418 and thus the shape of field of view 434 is controlled by fixed aperture 418. However, adjustable aperture 420 may be adjusted to overlap fixed aperture 418 in order to adjust the shape of field of view 434. The shape of adjustable aperture 420 and field of view 434 may be adjusted via aperture shunts 412 so that field of view 434 coincides with the desired area to be monitored for IR index fluctuations. In one embodiment, IR sensor assembly 400 is utilized as IR sensor 214 in autonomous ventilation system 200. Field of view 434 corresponds to cooking zone 216 and coincides with an area associated with cooking equipment 114 beneath exhaust hood 116. Field of view 434 may envelop any area associated with cooking equipment 114 including an area adjacent to cooking equipment 114 where uncooked food products are loaded for cooking, a portion of the surface of cooking equipment 114, or the entire surface of cooking equipment 114. To adjust the shape of field of view 434, one or more aperture set screws 416 are loosened to allow the associated aperture shunt 412 to slide freely. One or more aperture shunts 412 are adjusted so that one end overlaps fixed aperture 418. By overlapping fixed aperture 418, aperture shunts 412 will block light emitted via fixed aperture 418 and thus affect and control the shape of field of view 434. Once aperture shunts 412 are in the desired position and field of view 434 is in the desired shape, aperture set screws 416 are then tightened to secure aperture shunts from further movement and set the shape of adjustable aperture 420.

Once field of view 434 has been adjusted to match the area in which IR index fluctuations are to be monitored, the user may then rotate rotating turret 410 in order to use alignment laser 428 and/or thermopile sensor 432. For example, the user may rotate rotating turret 410 to align alignment laser 428 with fixed aperture 418. Alignment laser 428 may be any type of visible laser including a visible light laser diode. Once activated, alignment laser 428 will produce a point of light on any object in its line-of-sight. If IR sensor assembly 400 is aimed at a piece of equipment that is movable, this point of light produced by alignment laser 428 may be used to realign the piece of equipment back to the same position each time after it is moved. To do this, the user marks on the piece of equipment the location of the point of light produced by alignment laser 428 when it is in the desired position. After moving, the user would then reposition the piece of equipment so that the mark aligns with the point of light produced by alignment laser 428. This allows the piece of equipment to be easily realigned to the same position every time and prevents the user from having to continuously readjust field of view 434.

In addition, once field of view 434 has been adjusted to match the area in which IR index fluctuations are to be monitored, the user may rotate rotating turret 410 to align thermopile sensor 432 with fixed aperture 418 (this may be done regardless of the use of laser 428 as described above.) Once aligned with fixed aperture 418, thermopile sensor 432 will have the same field of view 434 as FOV indicator 430. Since thermopile sensor 432 does not emit visible light, the user would not be able to discern the field of view of thermopile sensor 432 without first utilizing FOV indicator 430. By utilizing both instruments, the user is able to finely tune the shape of field of view 434 and precisely select the area in which to monitor IR index fluctuations with thermopile sensor 432.

Modifications, additions, or omissions may be made to IR sensor assembly 400 and the described components. As an example, IR sensor assembly 400 may be designed to allow one or more of alignment laser 428, FOV indicator 430, and thermopile sensor 432 to be utilized at the same time. In such an embodiment, for example, a user may elect to illuminate field of view 434 with FOV indicator 430 while thermopile sensor 432 is monitoring IR index fluctuations in field of view 434. Other embodiments of IR sensor assembly 400 may not include alignment laser 428 or FOV indicator 430. Additionally, while certain embodiments have been described in detail, numerous changes, substitutions, variations, alterations and modifications may be ascertained by those skilled in the art, and it is intended that the present disclosure encompass all such changes, substitutions, variations, alterations and modifications as falling within the spirit and scope of the appended claims.

Figure 5A:
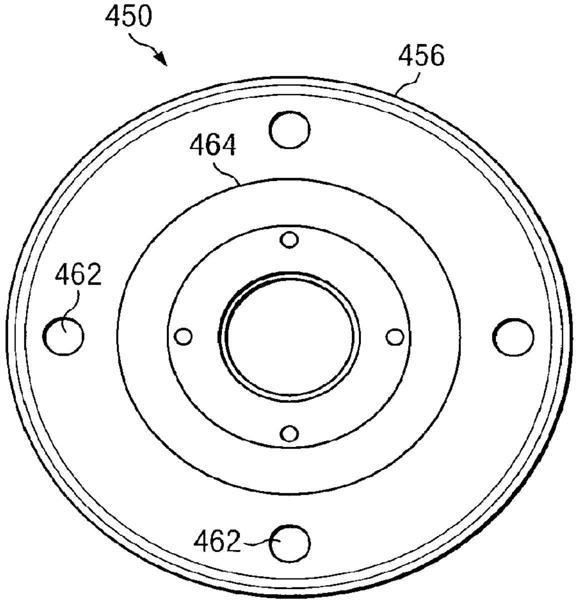
FIG. 5 is an exploded view of an IR sensor assembly in accordance with a another particular embodiment.
Figure 5B:
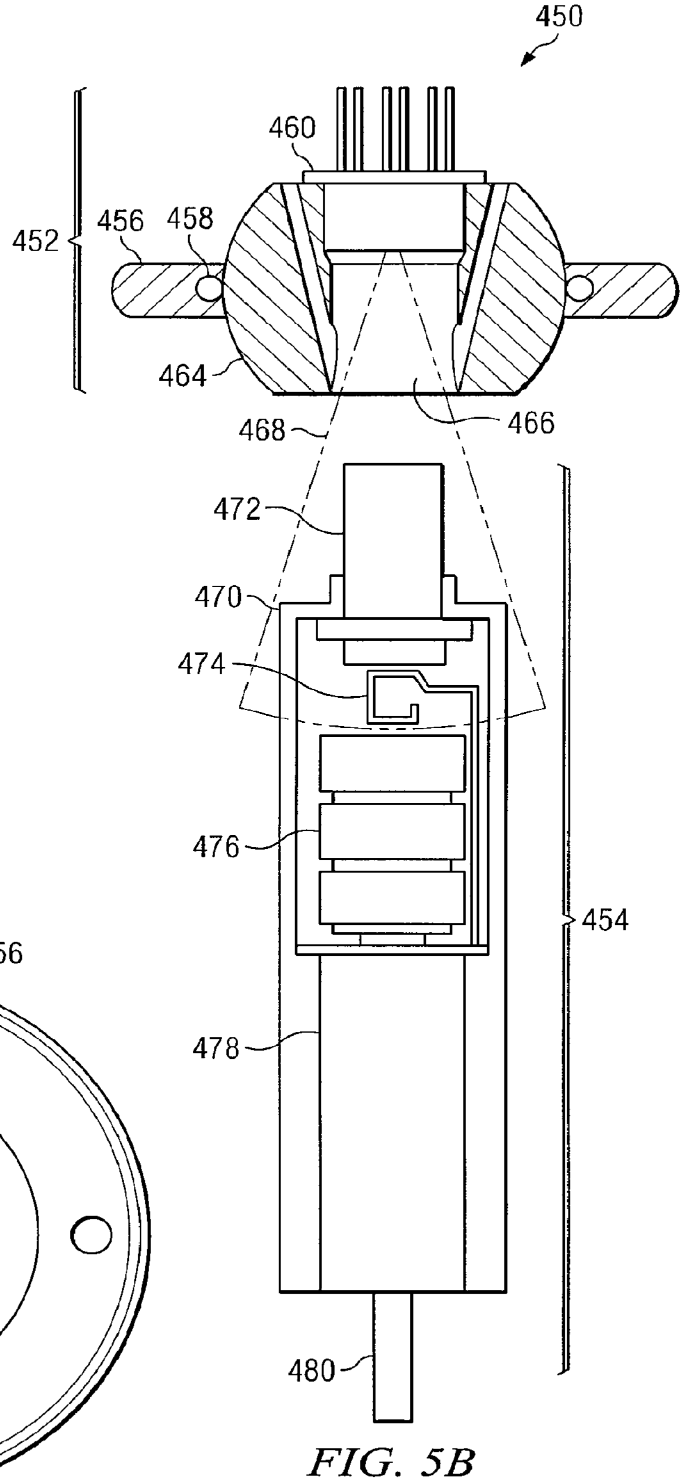

FIG. 5 depicts an IR sensor assembly 450, which could be also be utilized as IR sensor 214, discussed above in connection with FIGS. 2 and 3. IR sensor assembly 450 includes an eyeball housing assembly 452 and a laser calibration assembly 454.

Eyeball housing assembly 452 includes a retaining bracket 456, a position-fixing o-ring 458, and a ball housing 464. Retaining bracket 456 contains mounting holes 462 that allow it to be attached with fasteners such as screws to any surface. Retaining bracket 456 also contains a round void that is large enough to allow ball housing 464 to partially fit through. Position-fixing o-ring 458 is attached to retaining bracket 456 about the circumference of the round void and makes contact with ball housing 464 when it is placed into the round void. Retaining bracket 456 and position-fixing o-ring 458 together form a socket in which ball housing 464 pivots.

Ball housing 464 contains an aperture 466 and an IR sensor 460. IR sensor 460 is affixed to ball housing 464 on the opposite side of aperture 466 in such a way that allows it to have a line-of-sight through ball housing 464 and out aperture 466. IR sensor 460 receives an IR field 468 through ball housing 464 and aperture 466. IR sensor 460 detects IR index fluctuations inside IR field 468. IR field 468 is in the shape of aperture 466 which may be any shape including round as shown in FIG. 5. In some embodiments, the shape of aperture 466 is adjustable by a user similar to how the airflow of an eyeball air vent is adjusted on many commercial airlines.

Laser calibration assembly 454 includes a housing 470, an activation button 472, a spring switch 474, coin cell batteries 476, and a diode laser 478. Housing 470 contains an opening at each end. Diode laser 478 is enclosed inside housing 470 in such a way as to allow it to shine a visible calibration beam 480 through the opening of one end of housing 470. Activation button 472 is also enclosed inside housing 470 and partially protrudes out of the opening in housing 470 opposite from calibration beam 480. Activation button 472 is in the shape of aperture 466 on ball housing 464 and is slightly smaller to allow it to easily slide into and out of aperture 466. For example, activation button 472 may be cylindrical in shape to allow it to fit into an aperture 466 that is round as seen in FIG. 5. Activation button 472 is also slightly smaller than the opening of housing 470 from which it protrudes. This allows it to move in and out of housing 470 through the opening. A lip adjacent to one end of activation button 472, however, prevents the button from sliding completely out of housing 470.

One or more coin cell batteries 476 are positioned adjacent to diode laser 478 inside housing 470. Enough coin cell batteries 476 are provided to power diode laser 478, causing it to produce visible calibration beam 480. Coin cell batteries 476 are positioned inside housing 470 so that only one terminal (positive or negative) of coin cell batteries 476 is coupled to diode laser 478. Spring switch 474 is positioned inside housing 470 between the other (uncoupled) terminal of coin cell batteries 476 and activation button 472. It is coupled to diode laser 478 on one end and activation button 472 on the other. A small gap of air exists between spring switch 474 and the uncoupled terminal of coin cell batteries 476 when laser calibration assembly is inactive so that the electrical circuit between coin cell batteries 476 and diode laser 478 is not complete.

In operation, eyeball housing assembly 452 is mounted with retaining bracket 456 in a location where it has a clear line-of-sight to an area to be monitored for IR index fluctuations. Once mounted in a desired location, eyeball housing assembly 452 may be adjusted by pivoting ball housing 464. This allows three dimensional adjustments to aim IR sensor 460 at the desired location. This is similar in operation to an eyeball air vent that is typical in most commercial airlines. Ball housing 464 pivots about the void in retaining bracket 456 and maintains its position after adjustments due to the pressure applied by position-fixing o-ring 458.

Because IR sensor 460 produces IR field 468 that is invisible to the human eye, it is difficult to reliably determine exactly where IR sensor assembly 450 is aimed. To alleviate this problem, a user may utilize laser calibration assembly 454. To do so, a user first inserts the end of laser calibration assembly 454 containing activation button 472 into aperture 466 of ball housing 464. Activation button 472 will slide into aperture 466 for a certain distance until it comes into contact with a portion of ball housing 464 or IR sensor 460 that impedes its movement. At this point, the user continues to apply pressure to IR sensor assembly 450 in the direction of ball housing 464. This will cause housing 470 to then slide toward ball housing 464 while activation button 472 remains immobile. This causes the end of activation button 472 inside housing 470 to contact spring switch 474 and in turn causes spring switch 474 to contact the uncoupled terminal of coin cell batteries 476. This completes the electrical circuit between coin cell batteries 476 and diode laser 478 and produces visible calibration beam 480. While still grasping laser calibration assembly 454, the user may then adjust IR sensor assembly 450 by pivoting ball housing 464 about retaining bracket 456. Since laser calibration assembly 454 is still inserted into aperture 466 of ball housing 464 when the user makes this adjustment, diode laser 478 will be aligned with IR sensor 460. As a result, visible calibration beam 480 will be produced that is aligned with invisible IR field 468. The user may then adjust IR sensor assembly 450 by pivoting ball housing 464 until visible calibration beam 480 is in the desired position. Once in the desired position, the user finally removes laser calibration assembly 454 and allows IR field 468 to be received by IR sensor 460 through aperture 466 from the desired target.

Figure 6A:
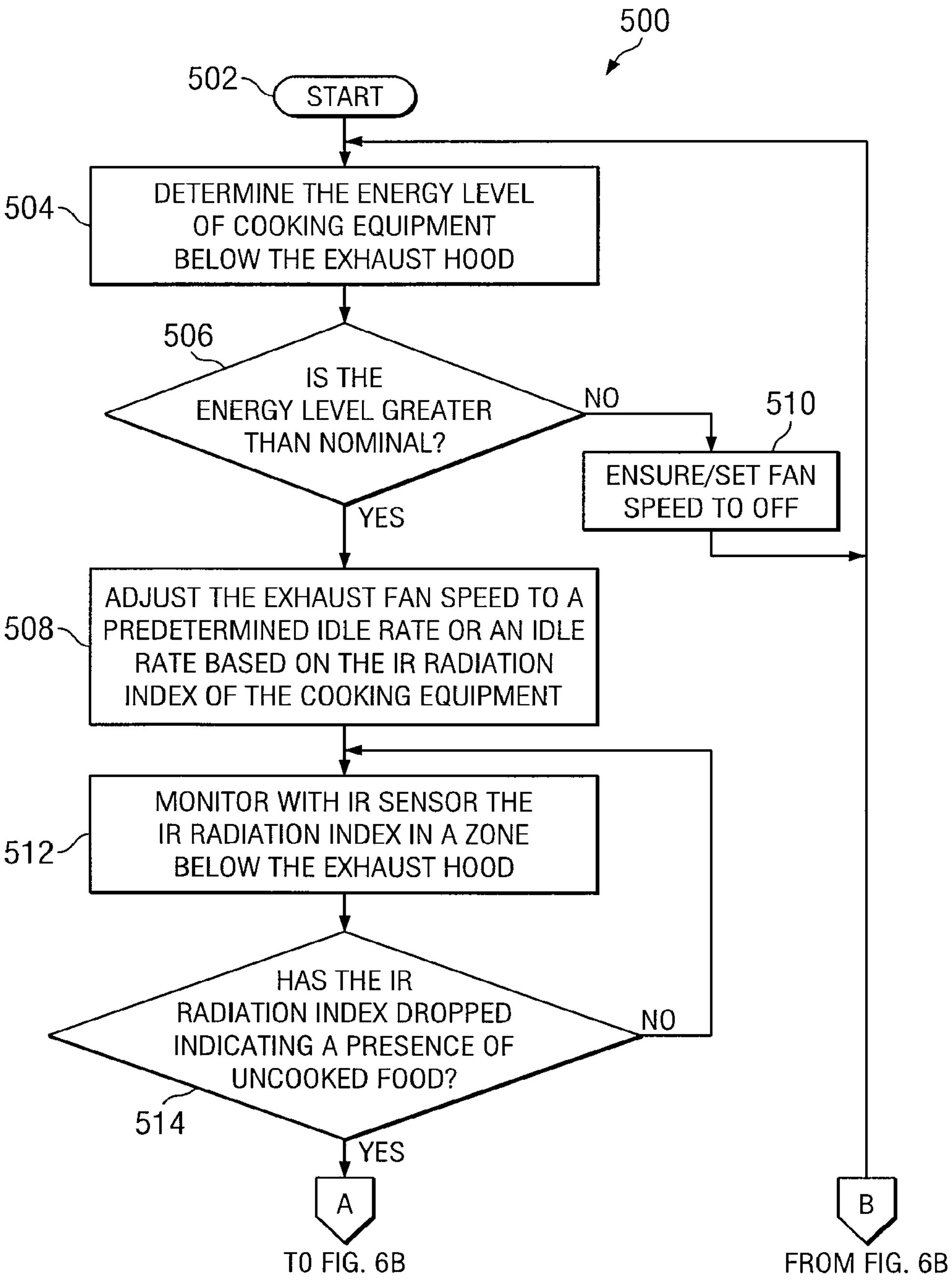
FIG. 6 is a method of controlling a ventilation system in accordance with a particular embodiment.
Figure 6B:
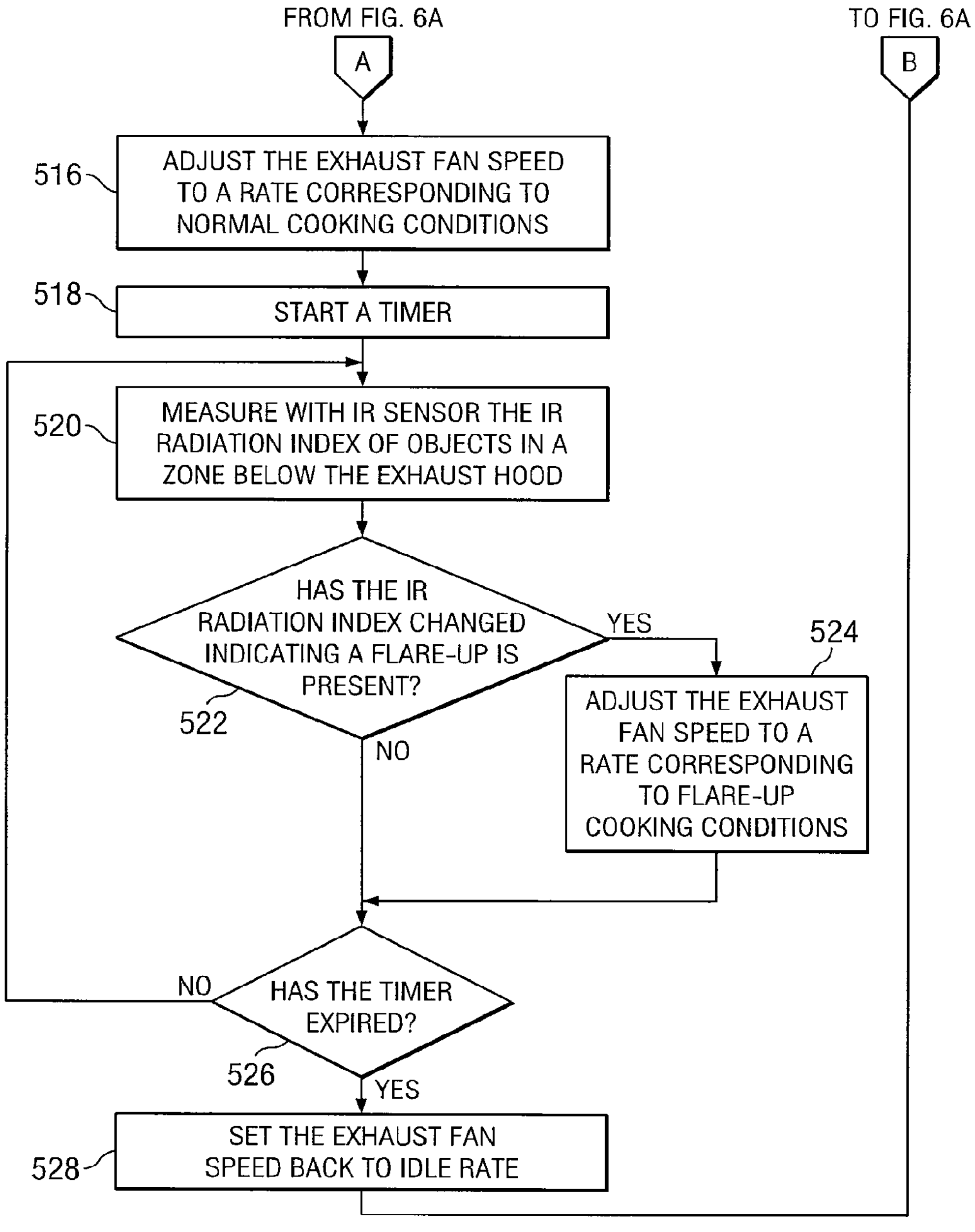

With reference now to FIG. 6, an autonomous ventilation control method 500 is provided. Autonomous ventilation control method 500 may be implemented, for example, by controller 220 described in reference to autonomous ventilation systems 200 and 300 in FIGS. 2 and 3 above. Autonomous ventilation control method 500 will now be described in reference to controller 220 as utilized in kitchen 102. It must be noted, however, that autonomous ventilation control method 500 may be utilized by any controller to control a ventilation system regardless of location.

Autonomous ventilation control method 500 begins in step 504 where the energy level of cooking equipment 114 is determined or where the activation of the equipment is otherwise determined. The energy level of cooking equipment 114 may be determined by any suitable technique, including utilizing IR sensor 214 to determine the IR index of the cooking surface or cooking medium of cooking equipment 114 or determining the state/settings of equipment controls through a connection with controller 220. In step 506, a decision is made based on the energy level determined in step 504. For example, if the IR index of the cooking surface or cooking medium of cooking equipment 114 is not greater than the average IR index when not in use (i.e., the energy level is low or zero), it is determined that no ventilation is required. As a result, exhaust fan 210 is turned off if it is not already off and autonomous ventilation control method 500 proceeds back to step 504. If, however, the IR index of the cooking surface or cooking medium of cooking equipment 114 determined in step 504 is greater than the average IR index when not in use (or if the energy level is otherwise determined to be above a particular threshold), autonomous ventilation control method 500 proceeds to step 508 where the speed of exhaust fan 210 is a set to an idle rate. The idle rate may be, for example, a predetermined rate or a rate based on the measured IR index.

Once it is determined in steps 504 and 506 that cooking equipment 114 has been activated, autonomous ventilation control method 500 next proceeds to monitor cooking zone 216. In step 512, the IR index of cooking zone 216 is monitored with IR sensor 214. In step 514, the IR index (or changes in IR index) of cooking zone 216 is analyzed to determine if uncooked (i.e., cold) food has been introduced. If it is determined in step 514 that a drop in IR index has occurred due to uncooked food being introduced into cooking zone 216, the speed of exhaust fan 210 is adjusted to a predetermined normal cooking rate in step 516. In particular embodiments, the speed may be adjusted based on the amount of the drop in IR index determined in step 514.

After adjusting the speed of exhaust fan 210 to a predetermined normal cooking level, autonomous ventilation control method 500 may next proceed to start a timer in step 518. The length of the timer in step 518 determines how long exhaust fan 210 remains at the cooking rate. The length of the timer may be based on the amount of IR index drop caused by the introduction of food into cooking zone 216. The larger the drop in IR index measured in step 512, the more uncooked or cold food has been introduced into cooking zone 216. The length of the timer set in step 518 may also be a fixed amount of time corresponding to the type of cooking equipment and/or food being cooked or it may be an amount of time programmed by a user. Note that in some embodiments, a timer my not be used at all to determine how long exhaust fan 210 remains at the cooking rate. In such an embodiment, IR sensor 214 may be used to determine when cooking is complete and set exhaust fan 210 back to the idle rate.

After setting the timer in step 518, autonomous ventilation control method 500 may next proceed to monitor cooking zone 216 for flare-ups. A flare-up condition occurs when excessive amounts of air contaminants 122 such as steam, smoke, or heat are produced by cooking with cooking equipment 114. To determine if a flare-up exists, the IR index of cooking zone 216 is measured with IR sensor 214 in step 520. In step 522, the IR index is analyzed to determine if a change in IR index has occurred due to the presence of excessive amounts of air contaminants 122. The change in IR index may include a decrease associated with excessive amounts of smoke, steam, or vapor or it may be an increase associated with excessive amounts of heat from flames. If a flare-up condition exists, the speed of exhaust fan 210 is increased from the normal cooking rate to a predetermined flare-up rate. If no flare-up condition exists, the speed of the exhaust fan 210 is maintained at the normal cooking rate.

Next, autonomous ventilation control method 500 proceeds to determine in step 526 if the timer set in step 518 has expired. If the timer has expired, the speed of exhaust fan 210 is decreased to the idle rate in step 528 and autonomous ventilation control method 500 proceeds back to step 504 to monitor the energy level of cooking equipment 114. If the timer has not expired, autonomous ventilation control method 500 proceeds back to step 520 to monitor for flare-up conditions. Alternatively, if a timer is not used in a particular embodiment, IR sensor 214 may be used in step 526 to determine when cooking is complete and proceed to the next step.

While a particular autonomous ventilation control method has been described, it should be noted that certain steps may be rearranged, modified, or eliminated where appropriate. Additionally, while certain embodiments have been described in detail, numerous changes, substitutions, variations, alterations and modifications may be ascertained by those skilled in the art, and it is intended that the present disclosure encompass all such changes, substitutions, variations, alterations and modifications as falling within the spirit and scope of the appended claims.

What is claimed is:

1. An autonomous ventilation system comprising:

a variable-speed exhaust fan operable to remove an air contaminant from an area;

a controller coupled to the variable-speed exhaust fan and operable to adjust the speed of the exhaust fan;

an exhaust hood coupled to the exhaust fan, the exhaust hood operable to direct the air contaminant to the exhaust fan; and an infrared radiation ("IR") sensor coupled to the controller, the IR sensor configured to detect a change in IR index in a zone below the exhaust hood and to communicate information relating to detected changes in IR index to the controller, wherein the controller is further operable to adjust the speed of the fan in response to information relating to changes in IR index detected by the IR sensor, said IR sensor is part of a sensor assembly, which also includes:

an alignment laser operable to visibly indicate a point at which the sensor assembly is aimed;

a field-of-view indicator operable to visibly illuminate an area where the IR sensor is operable to detect the change in IR index;

a rotating turret supporting the IR sensor, the alignment laser, and the FOV indicator; and an aperture assembly having one or more adjustable shunts operable to adjust the size of the area where the IR sensor is operable to detect the change in IR index by changing a size and/or shape of an aperture of the sensor assembly, the rotating turret and the aperture are constructed such that only one of the IR sensor, the alignment laser, and the FOV indicator is aligned with said aperture at a time, the IR sensor has a field of view defined by the aperture when the IR sensor is aligned with the aperture, and the FOV indicator provides a visual indication of the IR sensor field of view in said area when the FOV indicator is aligned with the aperture.

2. The system of claim 1, wherein the IR sensor is a thermopile sensor.

3. The system of claim 1, further comprising a variable-speed supply fan that is configured to deliver supply air to said area, wherein the controller is further configured to adjust the speed of the supply fan based on a speed of the exhaust fan.

4. A method of ventilating an area comprising:

providing a controller coupled to a variable-speed exhaust fan, the variable-speed exhaust fan having an associated exhaust hood and is operable to remove an air contaminant from an area;

providing an infrared radiation ("IR") sensor coupled to the controller;

sensing an IR index change in a zone below the exhaust hood using the IR sensor; and adjusting the speed of the variable-speed exhaust fan using the controller based on the IR index change sensed by the IR sensor in the zone below the exhaust fan, said IR sensor operating in a sensor assembly, the method further including, using the sensor assembly;

aligning an alignment laser to visibly indicate a point at which the sensor assembly is aimed;

using a field-of-view indicator, visibly illuminating an area where the IR sensor is operable to detect the change in IR index;

supporting the IR sensor, the alignment laser, and the FOV indicator using a rotating turret; and using one or more adiustable shunts of an aperture assembly, adjusting the size of the area where the IR sensor is operable to detect the change in IR index by changing a size and/or shape of an aperture of the sensor assembly, the sensing an IR index change being such that the IR sensor has a field of view defined by the aperture, and using the FOV indicator, visually indicating the IR sensor field of view in said area while aligning the FOV indicator with the aperture, the sensing an IR index change, the aligning an alignment laser and, the visually indicating employing the rotating turret and the aperture such that only one of the IR sensor, the alignment laser, and the FOV indicator is aligned with said aperture at a time.

5. The method of claim 4, wherein the exhaust hood is located above one or more pieces of cooking equipment, and the exhaust fan is configured to exhaust contaminants arising from operation of said cooking equipment.

6. The method of claim 4, wherein the sensed IR index change is a decrease associated with an introduction of a food product to the zone below the exhaust hood, and the speed of the exhaust fan is adjusted to a predetermined speed for a predetermined period of time associated with cooking of the food product.

7. The method of claim 4, wherein the sensed IR index change is a decrease associated with an air contaminant produced by a food product being cooked in the zone below the exhaust hood, and the speed of the exhaust fan is adjusted to a predetermined speed so as to remove the air contaminant.

8. The method of claim 4, further comprising:

controlling a variable-speed supply fan that is configured to deliver supply air from an air supply source to said area; and adjusting a speed of the supply fan based on the speed of the exhaust fan.

9. The method of claim 8, wherein the adjusted speed of the supply fan is greater than or equal to the speed of the exhaust fan.

10. A sensor assembly comprising:

an infrared radiation ("IR") sensor operable to detect a change in IR index within its field of view;

an alignment laser operable to visibly indicate a point at which the sensor assembly is aimed;

a field-of-view ("FOV") indicator operable to visibly illuminate an area where the IR sensor is operable to detect the change in IR index;

a rotating turret supporting the IR sensor, the alignment laser, and the FOV indicator;

an aperture assembly having one or more adjustable shunts operable to adjust the size of the area where the IR sensor is operable to detect the change in IR index by changing a size and/or shape of an aperture of the sensor assembly, wherein the rotating turret and the aperture are constructed such that only one of the IR sensor, the alignment laser, and the FOV indicator is aligned with said aperture at a time, the IR sensor field of view is defined by the aperture when the IR sensor is aligned with the aperture, and the FOV indicator provides a visual indication of the IR sensor field of view in said area when the FOV indicator is aligned with the aperture.

* * * * *